United States Patent [19]

Wakita et al.

[11] 4,095,569

[45] Jun. 20, 1978

[54] INTERNAL COMBUSTION ENGINE WITH AN EXHAUST GAS RECIRCULATING DEVICE

[75] Inventors: Nobuaki Wakita; Kiyoshi Yuuki, both of Susono, Japan

[73] Assignee: Toyota Jidosha Kogyo Kabushiki Kaisha, Toyota, Japan

[21] Appl. No.: 745,550

[22] Filed: Nov. 29, 1976

[30] Foreign Application Priority Data

Oct. 15, 1976 Japan ................................ 51-122954

[51] Int. Cl.² .......................................... F02M 25/00
[52] U.S. Cl. ............................ 123/119 A; 123/30 C
[58] Field of Search ........................... 123/119 A, 30 C

[56] References Cited

U.S. PATENT DOCUMENTS

| 4,014,300 | 3/1977 | Klomp | 123/30 C |
| 4,031,867 | 6/1977 | Yasuda | 123/119 A |

FOREIGN PATENT DOCUMENTS

| 1,089,292 | 10/1953 | France | 123/30 C |
| 209,029 | 8/1907 | Germany | 123/30 C |

Primary Examiner—Ronald H. Lazarus
Attorney, Agent, or Firm—Stevens, Davis, Miller & Mosher

[57] ABSTRACT

Disclosed is an internal combustion engine with an exhaust gas recirculating system. The engine has a movable shroud. The shroud is positioned near the rear surface of the valve head of the intake valve so as to obstruct a part of the mixture stream flowing through the valve opening of the intake valve for creating the swirl motion of the mixture in the combustion chamber when the amount of the recirculated exhaust gas is larger than a predetermined level. The shroud is retracted to a position where the shroud does not obstruct the mixture stream flowing in the intake port of the engine when the amount of the recirculated exhaust gas is smaller than said predetermined level.

11 Claims, 6 Drawing Figures

INTERNAL COMBUSTION ENGINE WITH AN EXHAUST GAS RECIRCULATING DEVICE

DESCRIPTION OF THE INVENTION

The present invention relates to an internal combustion engine with an exhaust gas recirculating device.

In order to reduce the amount of harmful $NO_x$ components in the exhaust gas, there has been known an internal combustion engine having an exhaust gas recirculating device (hereinafter referred to as an EGR device) for recirculating the exhaust gas from the exhaust system into the intake system. However, in an internal combustion engine of this type, the recirculated exhaust gas (hereinafter referred to as an EGR gas) introduced into the cylinder of the engine is not sufficiently mixed with the air-fuel mixture introduced into the cylinder of the engine. Consequently, when the mixture is ignited, fluctuation of the combustion is caused. As a result of this, there is the disadvantage that fluctuation of the torque is caused, thereby reducing the developed power of the engine.

On the other hand, there has been known an internal combustion engine in which a shroud is secured onto the rear surface of the valve head of the intake valve, or onto the inner wall of the intake port at a position near the valve head of the intake valve, thereby creating a swirl motion of the air-fuel mixture introduced into the cylinder of the engine. If a shroud of this type is applied to an internal combustion engine having an EGR device, the air-fuel mixture introduced into the cylinder of the engine and containing the EGR gas therein is swirled, whereby the EGR gas is sufficiently mixed with the air-fuel mixture. As a result of this, the burning velocity is quickened, thereby increasing the developed power of the engine.

When the engine is required to develop a high power, for example when the engine is operating under a heavy load, usually the amount of the EGR gas is reduced or the supply of the EGR gas is stopped in order to enhance the power development of the engine. At this time, if a shroud is fixed onto, for example, the valve head of the intake valve, the suction drag of the mixture is increased, whereby the engine cannot develop a high power. In addition, when the engine is required to develop a high power, the air-fuel mixture introduced into the cylinder of the engine contains only a small amount of the EGR gas therein, or contains no EGR gas therein. Consequently, in this case, even though the swirl motion of the introduced mixture is not caused due to the shroud, only a slight fluctuation of the combustion is caused.

An object of the present invention is to provide an internal combustion engine capable of reducing the amount of harmful $NO_x$ components in the exhaust gas and developing a high power.

According to the present invention, there is provided an internal combustion engine having an intake system, an exhaust system and an exhaust gas recirculating device having an exhaust gas control valve for changing the amount of the exhaust gas recirculated from the exhaust system into the intake system in accordance with the operating condition of the engine, said engine comprising: a combustion chamber; a cylinder head positioned over one end of said chamber and having therein a bore which has an inner wall defining an intake port; an intake valve mounted in said cylinder head for reciprocal movement therein and having a valve head, said valve head having a front surface facing said combustion chamber and a rear surface located opposite said front surface; obstructing means movable in said intake port for obstructing a part of a mixture stream flowing through the valve opening of said intake valve to create the swirl motion of the mixture containing the recirculated exhaust gas therein in said combustion chamber when the amount of the recirculated exhaust gas is larger than a predetermined level, and; actuating means responsive to changes in the amount of the recirculated exhaust gas and operatively connected to said obstructing means for actuating said obstructing means to move between an operative position located near said rear surface of the valve head of the intake valve and an inoperative position where said obstructing means does not obstruct the mixture stream flowing in said intake port.

The above-mentioned object of the present invention may be more fully understood from the following description of preferred embodiments of the invention, together with the accompanying drawings.

DESCRIPTION OF PREFERRED EMBODIMENTS

Figure 1:
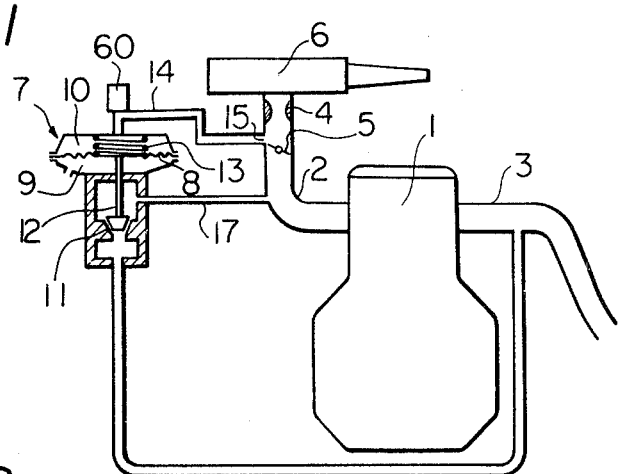
FIG. 1 is a schematic view of an embodiment of an internal combustion engine according to the present invention.

Referring to FIG. 1, an internal combustion engine according to the present invention comprises an engine body 1, an intake manifold 2, an exhaust manifold 3, a carburetor 4, a throttle valve 5 of the carburetor 4, an air cleaner 6 and an EGR valve 7. The EGR valve 7 comprises a diaphragm 8, and an atmospheric pressure chamber 9 and a vacuum chamber 10 which are separated by the diaphragm 8. Fixed onto the diaphragm 8 is an opening control valve 12 controlling the opening area of a valve port 11. In addition, the diaphragm 8 is always biassed downwardly due to the spring force of a compression spring 13 disposed in the vacuum chamber 10. The vacuum chamber 10 is connected via a vacuum conduit 14 to a vacuum port 15 opening into the carburetor 4 at a position located slightly upstream of the throttle valve 5 when the throttle valve 5 is in the closed position.

When the throttle valve 5 is slightly opened and, thus, the vacuum port 15 experiences a greater vacuum, the vacuum level in the vacuum chamber 10 becomes great. At this time, the diaphragm 8 moves upwards against the spring force of the compression spring 13, whereby the opening control valve 12 opens the valve port 11. Thus, the exhaust gas in the exhaust manifold 3 is recirculated into the intake manifold 2 via an EGR gas conduit 16, the valve port 11 and an EGR gas conduit 17. When the throttle valve 5 is opened to a greater extent and, thus, the vacuum level in the intake manifold 2 is decreased, the vacuum level in the vacuum chamber 10 is decreased. At this time, the diaphragm 8 moves downwards and, thus, the opening control valve 12 closes the valve port 11, whereby the recirculation of the EGR gas is stopped.

As is shown in FIG. 1, a vacuum reactive switch 60 detecting the vacuum level in the vacuum chamber 10 is disposed in the vacuum conduit 14. The amount of the opening area of the valve port 11 is changed in accordance with the vacuum level in the vacuum chamber 10. Consequently, the amount of the EGR gas is changed in accordance with the vacuum level in the vacuum chamber 10. Assuming that the vacuum level in the vacuum chamber 10 is P mmHg when the valve port 11 is closed, the vacuum reactive switch 60 is set so that, when the vacuum level in the vacuum chamber 10 is smaller than P, that is when the recirculation of the EGR gas is stopped, the vacuum reactive switch 60 turns to the ON condition; while, when the vacuum level in the vacuum chamber 10 is larger than P, that is when the exhaust gas is recirculated, the vacuum reactive valve 60 turns to the OFF condition.

Figure 2:
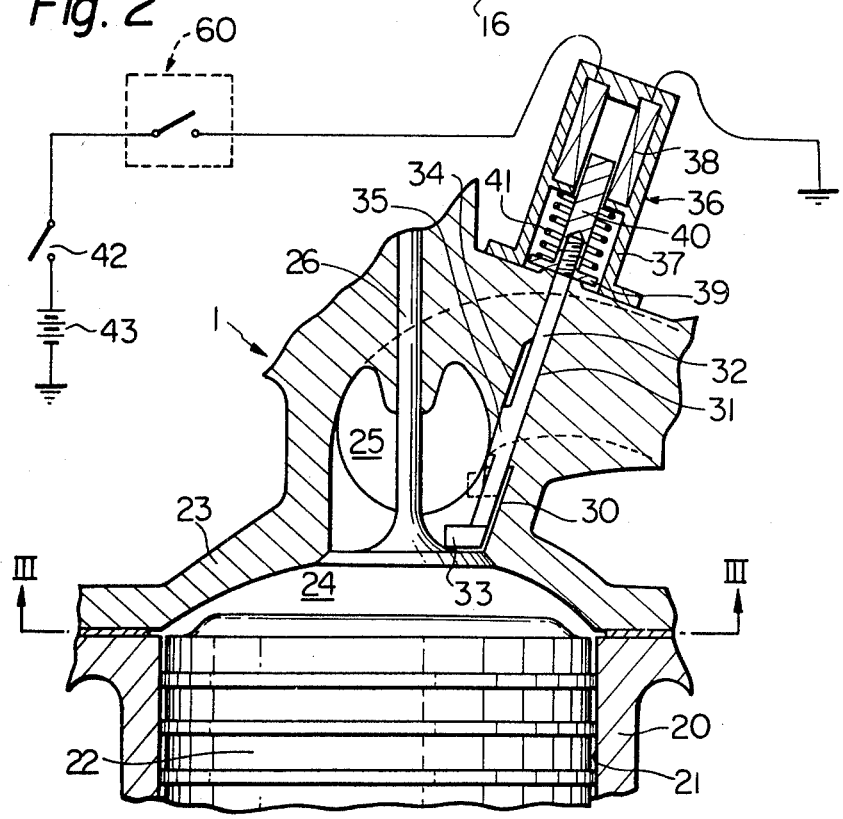
FIG. 2 is a cross-sectional side view of the engine body in FIG. 1, taken along the line II—II in FIG. 3.
Figure 3:
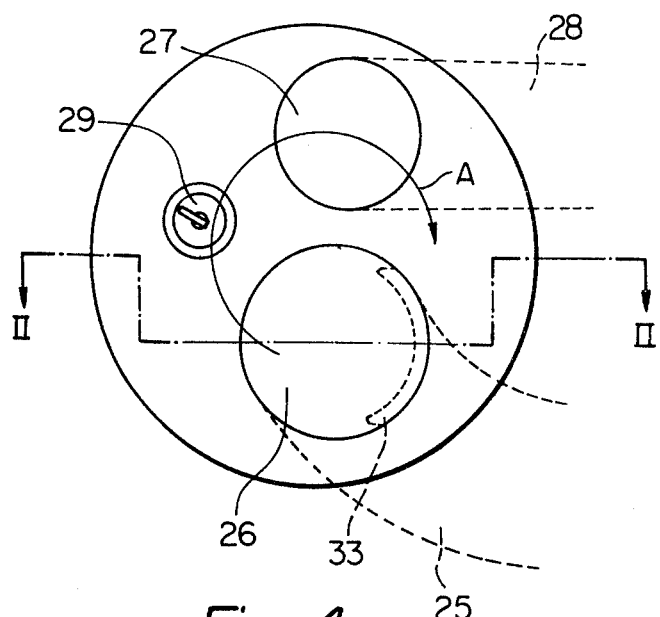
FIG. 3 is a view taken along the line III—III in FIG. 2.

Referring to FIGS. 2 and 3, the engine body 1 comprises a cylinder block 20, a piston 22 reciprocally movable in a cylinder 21 formed in the cylinder block 20, a cylinder head 23 fixed to the cylinder block 20, a combustion chamber 24 formed between the inner wall of the cylinder head 23 and the top surface of the piston 22, an intake port 25 formed in the cylinder head 23, an intake valve 26, an exhaust valve 27 (see FIG. 3), an exhaust port 28 and a spark plug 29. A recess 30 is formed on the inner wall of the intake port 25 near the rear surface of the valve head of the intake valve 26. A through-hole 31, extending upwards from the upper end wall of the recess 30, is formed in the cylinder head 23 so that the axis of the through-hole 31 is positioned at an acute angle with respect to the axis of the intake valve 26. A rod 32 is movably mounted in the through-hole 31. A shroud 33, having an arc shaped cross-section as shown by the broken line in FIG. 3, is fixed to the lower end of the rod 32. A groove 34 is formed in the cylinder head 23 along the through-hole 31. A projection 35 formed on the rod 31 is fitted into the groove 34, thereby preventing the rotation of the rod 31.

An electromagnetic device 36 is mounted on the cylinder head 23 and comprises a housing 37, a solenoid 38, a movable plunger 40, having on its lower end a flange 39, and a compression spring 41 interposed between the flange 39 and the housing 37. The upper end of the rod 32 is screwed into the movable plunger 40. The solenoid 38 is connected to a battery 43 via the vacuum reactive switch 15 shown in FIG. 1 and an ignition switch 42.

When the vacuum level in the intake manifold 2 is larger than the above-mentioned predetermined vacuum level P, that is, when the valve port 11 is opened and, thus, the EGR gas is recirculated, the vacuum reactive valve 60 is in the OFF condition. At this time, the shroud 33 is positioned above the rear surface of the valve head of the intake valve 32 with a slight distance therebetween as shown by the solid line in FIG. 2. Consequently, the flow of a part of the air-fuel mixture introduced into the combustion chamber 24 from the intake port 25 is obstructed due to the shroud 33, whereby the swirl motion of the mixture shown by the arrow A in FIG. 3 is created in the combustion chamber 24.

On the other hand, when the vacuum level in the intake manifold 2 is smaller than the above-mentioned predetermined vacuum level P, that is, when the valve port 11 is closed and, thus, the recirculation of the EGR gas is stopped, the vacuum reactive switch 60 is in the ON condition. At this time, the solenoid 38 is excited and, thereby, the movable plunger 40 moves upwards against the spring force of the compression spring 41. As a result of this, the shroud 33 is retracted to a position shown by the broken line in FIG. 2, wherein the mixture flowing in the intake port 25 is not subjected to the drag due to the shroud 33.

In general, when the EGR rate (ratio of the amount of EGR gas to the amount of the mixture introduced into the cylinder of the engine) is smaller than five percent, even if the EGR gas is not sufficiently mixed with the air-fuel mixture, only a small fluctuation of the combustion is caused. Consequently, assuming that the vacuum level in the vacuum chamber 10 of the EGR valve 7 is Po when the EGR rate is equal to five percent, by setting the vacuum reactive valve 60 so that it is turned to the OFF condition from the ON condition when the vacuum level in the vacuum chamber 10 becomes equal to Po, it is possible to project the shroud 33 to the position near the rear surface of the valve head of the intake valve 26 when the EGR rate is increased beyond 5 percent.

Figure 4:
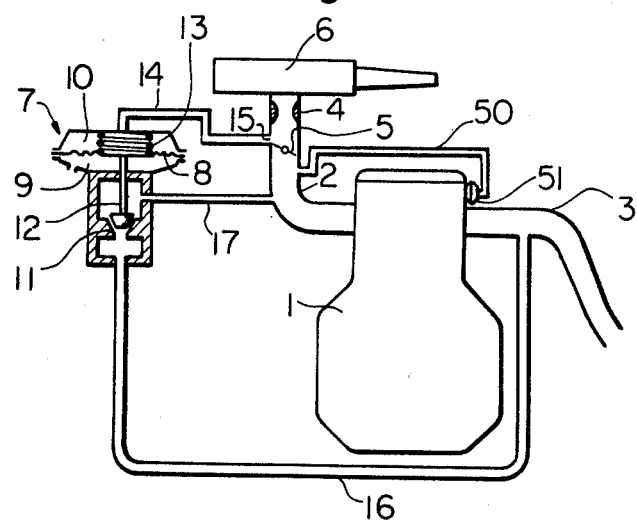
FIG. 4 is a schematic view of an alternative embodiment according to the present invention.
Figure 5:
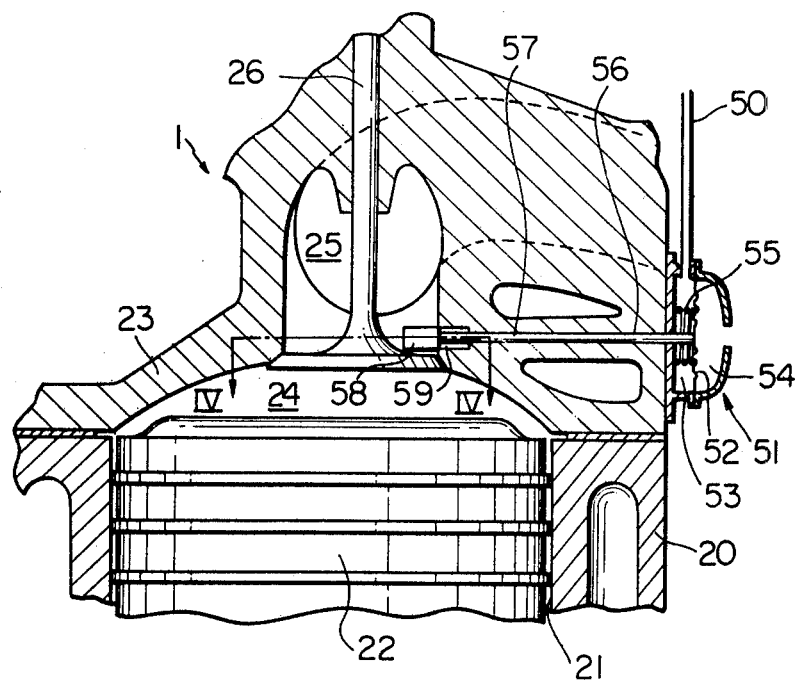
FIG. 5 is a cross-sectional side view of the engine body in FIG. 4.
Figure 6:
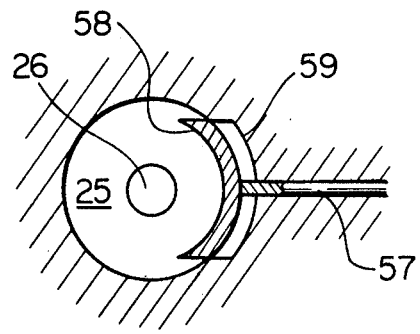
FIG. 6 is a view taken along the line IV—IV in FIG. 5.

FIGS. 4 through 6 show an alternative embodiment. In FIGS. 4 through 6, similar components to those in FIGS. 1 through 3 are indicated with the same reference numerals as used in FIGS. 1 through 3. Referring to FIG. 4, a diaphragm device 51 is mounted on the engine body 1 and is connected via a vacuum conduit 50 to the intake manifold at a position located downstream of the throttle valve 5. As is shown in FIG. 5, the diaphragm device 51 comprises a diaphragm 52, and a vacuum chamber 53 and an atmospheric pressure chamber 54 which are separated by the diaphragm 52. The vacuum chamber 53 is connected to the vacuum conduit 50. A compression spring 55 is disposed in the vacuum chamber 53 for always biasing the diaphragm 52 towards the right in FIG. 5. A through-hole 56 is formed in the cylinder head 23 so that the axis of the through-hole 56 is positioned at an approximately right angle with respect to the axis of the intake valve 26. A rod 57 is movably mounted in the through-hole 56. A shroud 58, having an arc shaped cross-section as shown in FIG. 6, is fixed onto the inner end of the rod 57. The outer end of the rod 57 is secured to the diaphragm 52.

When the vacuum level in the intake manifold 2 is large, that is, when the EGR gas is recirculated, the vacuum level in the vacuum chamber 53 is also large. At this time, the diaphragm 52 moves towards the left in FIG. 5, whereby the shroud 58 projects to the position near the rear surface of the valve head of the intake valve 26. On the other hand, when the vacuum level in the vacuum chamber 53 is small, that is, when the recirculation of the EGR gas is stopped, the vacuum level in the vacuum chamber 53 is also small. Consequently, at that time, the shroud 58 moves towards the right in FIG. 5, whereby the shroud 58 is retracted into a groove 59 formed on the inner wall of the intake port 25. In this embodiment, by adjusting the spring force of the compression spring 55, it is possible to project the shroud 58 when the EGR rate is increased beyond, for example, 5 percent.

According to the present invention, when the exhaust gas is recirculated, or when the EGR rate is increased beyond a predetermined rate, the swirl motion of the mixture is caused due to the shroud and, thus, the burning velocity is quickened. This prevents the fluctuation of the combustion, the fluctuation of the torque and the reduction of the developed power. In addition, the engine can develop a desired high power when required.

While the invention has been described by reference to specific embodiments chosen for purposes of illustration it should be apparent that numerous modifications could be made by those skilled in the art without departing from the spirit and scope of the invention.

What is claimed is:

1. An internal combustion engine having an intake system, an exhaust system and an exhaust gas recirculating device having an exhaust gas control valve for changing the amount of the exhaust gas recirculated from the exhaust system into the intake system in accordance with the operating condition of the engine, said engine comprising:
   a combustion chamber;
   a cylinder head positioned over one end of said chamber and having therein a bore which has an inner wall defining an intake port;
   an intake valve mounted in said cylinder head for reciprocal movement therein and having a valve head, said valve head having a front surface facing said combustion chamber and a rear surface located opposite said front surface;
   obstructing means movable in said intake port for obstructing a part of a mixture stream flowing through the valve opening of said intake valve to create the swirl motion of the mixture containing the recirculated exhaust gas therein in said combustion chamber when the amount of the recirculated exhaust gas is larger than a predetermined level, and;
   actuating means responsive to changes in the amount of the recirculated exhaust gas and operatively connected to said obstructing means for actuating said obstructing means to move between an operative position located near said rear surface of the valve head of the intake valve and an inoperative position where said obstructing means does not obstruct the mixture stream flowing in said intake port.

2. An internal combustion engine as claimed in claim 1, in which said exhaust gas control valve is a vacuum operated control valve for increasing the amount of the recirculated exhaust gas in accordance with an increase in vacuum in the intake port, wherein said actuating means is a vacuum operated actuating device for moving said obstructing means to said operative position when a vacuum in the intake port is larger than a predetermined level and moving said obstructing means to said inoperative position when a vacuum in the intake port is smaller than said predetermined level.

3. An internal combustion engine as claimed in claim 2, wherein said vacuum operated actuating device comprises a vacuum reactive switch and an electromagnetic device electrically connected to said vacuum reactive switch, said electromagnetic device being connected to said obstructing means.

4. An internal combustion engine as claimed in claim 2, wherein said vacuum operated actuating device comprises a diaphragm device having a vacuum chamber being connected to said intake port and said diaphragm being connected to said obstructing means.

5. An internal combustion engine as claimed in claim 1, in which said exhaust control valve is a vacuum operated control valve for recirculating the exhaust gas into the intake system when the vacuum in the intake port is larger than a predetermined vacuum level and stopping the recirculation of the exhaust gas when the vacuum in the intake port is smaller than said predetermined vacuum level, wherein said actuating means is a vacuum operated actuating device for moving said obstructing means to said operative position when the vacuum in the intake port is larger than said predetermined vacuum level and moving said obstructing means to said inoperative position when the vacuum in the intake port is smaller than said predetermined vacuum level.

6. An internal combustion engine as claimed in claim 5, wherein said vacuum operated actuating device comprises a vacuum reactive switch and an electromagnetic device electrically connected to said vacuum reactive switch, said electromagnetic device being connected to said obstructing means.

7. An internal combustion engine as claimed in claim 5, wherein said vacuum operated actuating device comprises a diaphragm device having a vacuum chamber and a diaphragm, said vacuum chamber being connected to said intake port and said diaphragm being connected to said obstructing means.

8. An internal combustion engine as claimed in claim 1, in which said engine has a carburetor having therein an intake passage and a throttle valve, said exhaust gas control valve being a vacuum operated control valve connected to said intake passage at a position located upstream of the throttle valve when the throttle valve is in the closed position, the recirculation of the exhaust gas being stopped at the time of idling.

9. An internal combustion engine as claimed in claim 1, wherein said obstructing means comprises a shroud secured to one end of a rod, the other end of said rod being connected to said actuating means.

10. An internal combustion engine as claimed in claim 9, wherein said shroud has an arc shaped cross-section.

11. An internal combustion engine as claimed in claim 9, wherein a recess is formed on the inner wall of said intake port, said shroud being retracted into said recess when said shroud is in said inoperative position.

* * * * *